4551-6

United States Patent [19]

Eller

[11] 3,806,813

[45] Apr. 23, 1974

[54] FILTER SYSTEM FOR AMPLIFIER STATION FOR AMPLIFYING SIGNALS IN SEPARATE FREQUENCY BANDS

[75] Inventor: Timothy S. Eller, Romulus, N.Y.

[73] Assignee: GTE Sylvania Incorporated, Seneca Falls, N.Y.

[22] Filed: June 26, 1972

[21] Appl. No.: 266,455

[52] U.S. Cl. .................... 325/308, 325/5, 325/477, 179/170 C, 343/180

[51] Int. Cl. .................... H04b 1/06

[58] Field of Search ..... 178/DIG. 13; 325/308, 477, 325/31, 5, 3; 179/1 FS, 170.2, 170 C; 343/180; 333/6, 10, 11

[56] References Cited

UNITED STATES PATENTS

| | | | |
|---|---|---|---|
| 3,717,813 | 2/1973 | Lieberman | 325/3 |
| 3,017,584 | 1/1962 | Lundry | 333/6 |
| 2,115,138 | 4/1938 | Darlington | 179/170 C |
| 1,743,691 | 1/1930 | Shea | 179/170 C |

*Primary Examiner*—Albert J. Mayer
*Attorney, Agent, or Firm*—Norman J. O'Malley; Cyril A. Krenzer; Robert E. Walrath

[57] ABSTRACT

A filter system for a communications system such as a bidirectional CATV system is shown. The filter system includes diplex filters having a substantially constant input impedance and a band stop filter to suppress signals at the cross-over frequency of the diplex filters.

7 Claims, 3 Drawing Figures

FILTER SYSTEM FOR AMPLIFIER STATION FOR AMPLIFYING SIGNALS IN SEPARATE FREQUENCY BANDS

CROSS-REFERENCE TO RELATED APPLICATION

D. Lieberman and R. E. Neuber, "Amplifier Station," Ser. No. 130,088, filed Apr. 1, 1971, now U.S. Pat. No. 3,717,813, and assigned to the same assignee as this invention.

BACKGROUND OF THE INVENTION

In communication systems such as community antenna television (CATV) system it is often desired to transmit signals in both directions over a transmission medium such as a coaxial cable. In a CATV system, for example, television signals in the VHF band of frequencies can be transmitted in one direction while signals in a separate band of frequencies can be transmitted in the opposite direction. Amplifier stations distributed along the transmission medium must have the capability of amplifying signals transmitted in both directions. A typical technique for amplifying the signals is to separate the signals in the different bands of frequencies, amplify each group of signals in separate amplifier channels, and recombine the signals.

Several techniques have been proposed for separating the signals in the separate bands of frequencies. One such proposed system uses directional couplers together with high pass and low pass filters. The directional couplers provide some of the necessary isolation with the filters providing the remainder. The major disadvantage of this technique is that the insertion loss of the directional couplers degrades the signal-to-noise ratio and reduces the output or amplification capability of the amplifier station. Thus, additional amplifiers are necessary to maintain proper signal levels.

Another approach uses diplex filters which have essentially lossless high pass and low pass sections. In order to obtain sufficient separation of the signals in the separate bands to prevent amplifier oscillation, a guard band between the frequency responses of the high pass and low pass filters is necessary. The guard band can be attained by filter design or by the addition of a trap. These filters, however, have the disadvantage of improper impedance matching with the transmission medium, such as coaxial cable, for signals which may be present at frequencies in the guard band. Such signals are accordingly reflected. It is also believed that the voltage standing wave ratio (VSWR) near the band edges of the frequency responses is poor and some known filters of this type are unduly complex.

In summary, no known prior art technique provides satisfactory separation of the signals in the separate frequency bands. The prior art techniques suffer from a variety of disadvantages such as excessive insertion loss, degradation of the signal-to-noise ratio, undue complexity, improper impedance matching, poor VSWR, and other similar disadvantages.

OBJECTS AND SUMMARY OF THE INVENTION

Accordingly, it is a primary object of this invention to obviate the above-noted disadvantages of the prior art.

It is a further object of this invention to provide a novel filter system for bidirectional communication systems.

It is a further object to provide a novel filter system that exhibits low VSWR and proper impedance matching over the entire frequency range.

It is a further object to provide a novel filter system including diplex filters for a bidirectional communications system with adequate isolation at the cross-over frequency.

In one aspect of this invention the above and other objects and advantages are achieved in a filter system in an amplifier station for a cummunication system which includes first and second diplex filters and a band stop filter. The band stop filter is included in one of first and second amplifier channels connected between the diplex filters and has a band stop frequency response for attenuating signals at the cross-over frequency of the diplex filters.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings.

Figure 1:
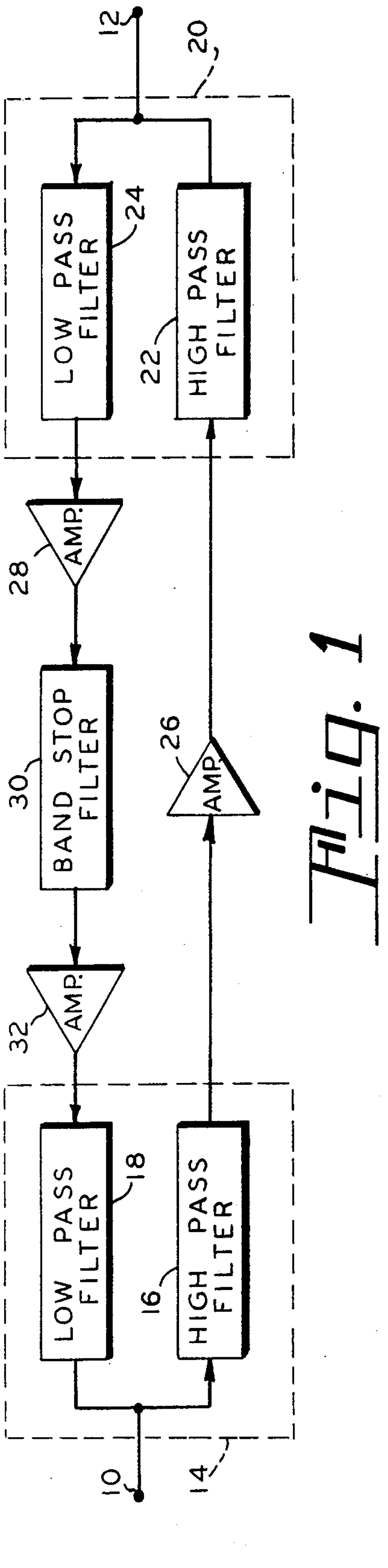
FIG. 1 is a block diagram of an amplifier station including the invention.

In FIG. 1 a preferred embodiment of a filter system in an amplifier station for use in a communications system wherein signals are carried over a transmission medium in first and second bands of frequencies is illustrated. While the invention will be described in connection with a community antenna television (CATV) system, those skilled in the art will realize that the invention can be used in other communication systems as well.

In a bidirectional CATV system signals are normally carried on a coaxial cable in a first band of frequencies that includes the VHF television signals. Return signals are typically carried in a second band of frequencies lower in frequency. The first or VHF band is typically above 50 mHz while the second or sub-VHF is typically below 40 mHz with the band of frequencies between 40 and 50 mHz serving as a guard band. While in general the signals in the two bands flow in opposite directions, they can flow in the same direction in some circumstances. Amplifier stations distributed along the coaxial cable have at least first and second ports adapted to be connected to coaxial cable segments and include amplifiers for separately amplifying signals in the first and second bands of frequencies. The amplifier station illustrated in FIG. 1 has first and second ports illustrated as terminals 10 and 12, respectively. Ports 10 and 12 are both input and output ports depending upon which set of signals is being considered. Port 10 is connected to a common junction of a diplex filter 14 which has a high pass filter 16 and a low pass filter 18. Port 12 is connected to a common junction of a diplex filter 20 which has a high pass filter 22 and a low pass filter 24.

A first amplifier channel including an amplifier 26 is connected between high pass filters 16 and 22 to amplify signals in the first or VHF band of frequencies. A second amplifier channel is connected between low pass filters 24 and 18 to amplify signals in the second or sub-VHF band of frequencies. The sub-VHF amplifier channel preferably includes a first amplifier or amplifier stage 28 connected to low pass filter 24, a band stop filter 30 connected to amplifier 28, and a second amplifier or amplifier state 32 connected between band stop filter 30 and low pass filter 18.

To obtain proper impedance matching with the coaxial cable, diplex filters 14 and 20 should have an input impedance equal to the impedance of the coaxial cable ($Z_o$). A type of filter known as a complimentary filter can be used to satisfy this requirement. Complimentary filters have an input impedance which is $Z_o$ in the pass band and which goes to infinity in the stop band. A parallel combination of high pass and low pass complimentary filters can be provided which has an impedance $Z_o$ for all frequencies. To obtain a constant impedance at all frequencies, the frequency responses must cross at the 3 db points of both filters so that half the incident energy at the cross-over frequency is absorbed by each filter and none is reflected. Butterworth filters can be designed to be complimentary, however, Butterworth filters have a differential group delay which is higher than desired for diplex filters 14 and 20.

While Butterworth filters can be used to practice this invention, another class of filters called psuedo-complimentary elliptic function filters are preferred for diplex filters 14 and 20 because they have less differential group delay and achieve the desired selectivity with fewer poles. Elliptic function filters are described in an article by R. J. Wenzel, "Wideband High-Selectivity Diplexers Utilizing Digital Elliptic Filters," *IEEE Transactions on Microwave Theory and Techniques*, Vol. MTT-15, No. 12, December 1967, pp. 669–680. While such filters are not truly complimentary, they can approach complimentary filters to an arbitrary degree of exactness. Such filters are also preferred because they also have a very low VSWR and provide maximum skirt selectivity with minimum delay distortion.

Figure 2:
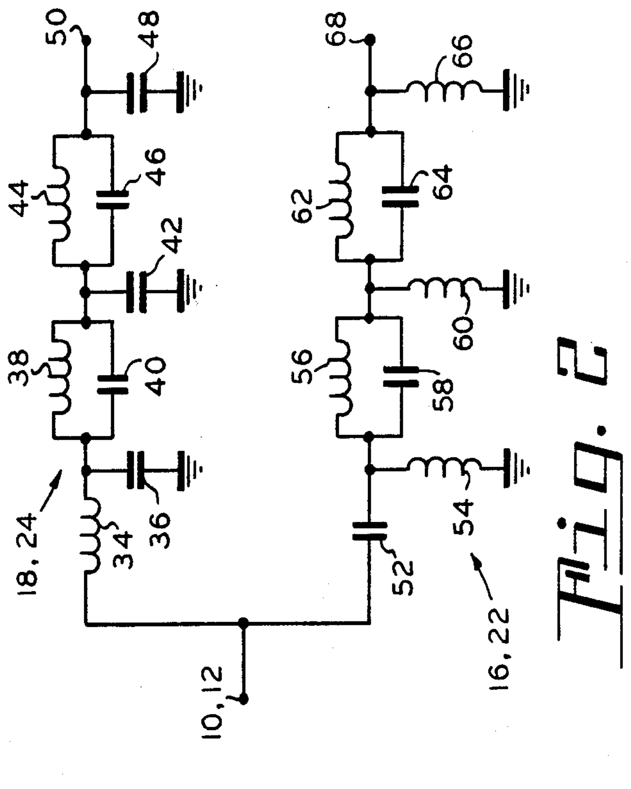
FIG. 2 is a schematic diagram of a preferred embodiment of a diplex filter.

A suitable diplex filter which can be used for both diplex filters 14 and 20 is illustrated in FIG. 2. Low pass filter 18 or 24 includes a coil 34 and a capacitor 36 connected in series between port 10 or 12 and a common conductor illustrated as ground. A coil 38 and a capacitor 40 are connected in parallel and further in series with a capacitor 42 between the junction of coil 34 and capacitor 36 and ground. A coil 44 and a capacitor 46 are connected in parallel and further in series with a capacitor 48 between the junction of coil 38 with capacitors 40 and 42 and ground. The junction of coil 44 with capacitors 46 and 48 is connected to a terminal 50 which corresponds to the input of amplifier 28 or output of amplifier 32.

High pass filter 16 or 22 includes a capacitor 52 and a coil 54 connected in series between port 10 or 12 and ground. The junction of capacitor 52 and coil 54 is connected by a coil 56 in parallel with a capacitor 58 further in series with a coil 60 to ground. The junction of capacitor 58 with coils 56 and 60 is connected by a coil 62 in parallel with a capacitor 64 further in series with a coil 66 to ground. The junction of capacitor 64 with coils 62 and 66 is connected to a terminal 68 which corresponds to the input or output of amplifier 26.

While a diplex filter of psuedo-complimentary elliptic function filter design operates satisfactory, the 3 db signal attenuation at the frequency cross-over of the frequency responses does not provide sufficient isolation. Thus, the amplifier system can oscillate because the amplifiers provide greater gain than the attenuation of the filters for signals in the guard band. It is known to add a trap, for example, at the junction of the high and low pass filters, however, a trap deleteriously affects the impedance match with the coaxial cable. Band stop filter 30 is designed to have a stop band at the cross-over frequency of the diplex filters to further attenuate the signals near the cross-over frequency thereby preventing oscillation of the amplifiers.

Figure 3:
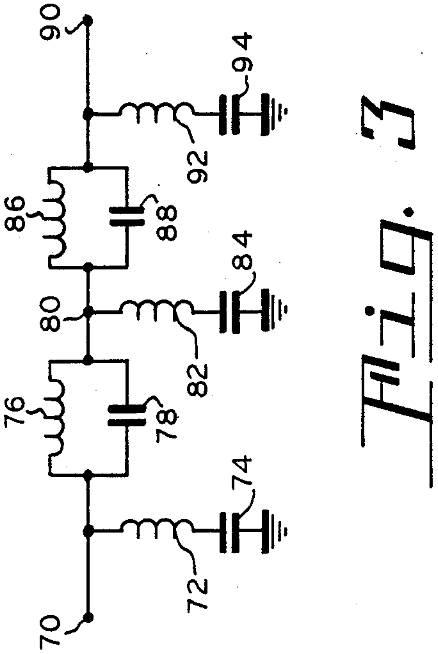
FIG. 3 is a schematic diagram of a preferred embodiment of a band stop filter.

Preferably band stop filter 30 is a Butterworth filter. A filter suitable for filter 30 is illustrated in FIG. 3. Therein a terminal 70 which corresponds to the output of amplifier 28 is connected by a coil 72 in series with a capacitor 74 to ground. Terminal 70 is further connected by a coil 76 in parallel with a capacitor 78 to a junction 80. Junction 80 is further connected by a coil 82 in series with a capacitor 84 to ground and by a coil 86 in parallel with a capacitor 88 to a terminal 90 which corresponds to the input of amplifier 32. Terminal 90 is further connected by a coil 92 in series with a capacitor 94 to ground.

Band stop filter 30 can be connected in either amplifier channel, however, in a CATV system it is preferably connected in the sub-VHF channel so that the television signals being distributed are as free from disturbance as possible. Also band stop filter 30 is illustrated as being isolated between two amplifiers or amplifier stages 28 and 32. In many applications it may not be necessary to provide such isolation.

In one practical embodiment of the invention in a CATV system for separating VHF television signals from signals in a sub-VHF band of frequencies, the following component values were used for the filters of FIGS. 2 and 3.

| Capacitors in picofarads | Coils in microhenries |
|---|---|
| **36** – 68 | **34** – 0.446 |
| **40** – 30 | **38** – 0.292 |
| **42** – 56 | **44** – 0.262 |
| **46** – 22 | **54** – 0.196 |
| **48** – 16 | **56** – 0.446 |
| **52** – 30 | **60** – 0.242 |
| **58** – 47 | **62** – 0.659 |
| **64** – 50 | **66** – 0.82 |
| **74** – 8.2 | **72** – 1.60 |
| **78** – 110 | **76** – 0.122 |
| **84** – 27 | **82** – 0.496 |
| **88** – 110 | **86** – 0.122 |
| **94** – 8.2 | **92** – 1.5 |

While there has been shown and described what is at present considered the preferred embodiment of the invention, it will be obvious to those skilled in the art that various changes and modifications may be made therein without departing from the scope of the invention as defined by the appended claims.

What is claimed is:

1. In an amplifier station for a communication system wherein signals are carried over a transmission medium in first and second bands of frequencies, said amplifier station having first and second ports, a filter system comprising:

first and second diplex filters connected to said first and second ports, respectively, each of said diplex filters having a high pass filter and a low pass filter for passing the signals in a respective one of said bands of frequencies and further having a substantially constant impedance matched to the impedance of said transmission medium, said high pass and low pass filters having frequency responses that cross at the 3 db points; and first and second amplifier channels connected between said high pass filters and said low pass filters, respectively, each for amplifying said signals in a respective one of said first and second bands of frequencies, one of said first and second amplifier channels including first and second amplifiers and a band stop filter having a band stop frequency response connected therebetween for attenuating signals at the crossover frequency of the high pass and low pass filters of each of said diplex filters.

2. A filter system as defined in claim 1 wherein said signals in said first and second bands of frequencies are carried over said transmission medium in opposite directions.

3. A filter system as defined in claim 1 wherein said band stop filter is a Butterworth filter.

4. In an amplifier station for a community antenna television system wherein signals are carried on a coaxial cable in a first band of frequencies which includes VHF television signals and in a second band of frequencies lower in frequency than said first band of frequencies, said amplifier station having first and second ports adapted to be connected to coaxial cable segments, a filter system comprising:

first and second diplex filters connected to said first and second ports, respectively, each of said diplex filters having a high pass filter and a low pass filter for passing the signals in a respective one of said bands of frequencies wherein the impedance of each of said diplex filters is substantially constant and matched to the impedance of the coaxial cable over a frequency range including said first and second bands of frequencies and the guard band therebetween; and first and second amplifier channels connected between said high pass filters and said low pass filters, respectively, each for amplifying said signals in a respective one of said first and second bands of frequencies, one of said first and second amplifier channels including first and second amplifiers and a band stop filter having a band stop frequency response connected therebetween for attenuating signals at the cross-over frequency of each of said diplex filters.

5. A filter system as defined in claim 4 wherein said signals in said first and second bands of frequencies are transmitted in opposite directions.

6. A filter system as defined in claim 4 wherein said band stop filter is a Butterworth filter.

7. A filter system as defined in claim 4 wherein said band stop filter is connected in said second amplifier channel for amplifying signals in said second band of frequencies.

* * * * *